(12) United States Patent
Leo et al.

(10) Patent No.: US 9,672,155 B2
(45) Date of Patent: Jun. 6, 2017

(54) METHOD AND DEVICE FOR STORING DATA IN A MEMORY, CORRESPONDING APPARATUS AND COMPUTER PROGRAM PRODUCT

(71) Applicant: STMicroelectronics S.r.l., Agrate Brianza (IT)

(72) Inventors: Marco Leo, Locate di Triulzi (IT); Paolo Rosingana, Collegno (IT); Marco Castellano, Pavia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 91 days.

(21) Appl. No.: 14/664,630

(22) Filed: Mar. 20, 2015

(65) Prior Publication Data

US 2016/0011981 A1    Jan. 14, 2016

(30) Foreign Application Priority Data

Jul. 8, 2014   (IT) ............... TO2014A0545

(51) Int. Cl.
*G06F 12/00* (2006.01)
*G06F 12/0875* (2016.01)
*G01D 9/00* (2006.01)

(52) U.S. Cl.
CPC ......... *G06F 12/0875* (2013.01); *G01D 9/005* (2013.01); *G06F 2212/1056* (2013.01); *G06F 2212/451* (2013.01)

(58) Field of Classification Search
CPC ................. G06F 12/08; G06F 12/0875; G06F 2212/451; G06F 2212/1056; G01D 9/005

USPC .......................................... 711/132
See application file for complete search history.

(56) References Cited

U.S. PATENT DOCUMENTS

| | | | |
|---|---|---|---|
| 8,116,936 B2* | 2/2012 | Hershey | F02D 41/249 701/14 |
| 9,098,753 B1* | 8/2015 | Zhu | G06K 9/00805 |
| 9,474,475 B1* | 10/2016 | Budiman | A61B 5/14532 |
| 2009/0184849 A1 | 7/2009 | Nasiri et al. | |
| 2010/0073535 A1* | 3/2010 | Huggett | H04N 5/335 348/297 |

(Continued)

FOREIGN PATENT DOCUMENTS

WO    02/07014 A1    1/2002

OTHER PUBLICATIONS

U.S. Appl. No. 15/195,352, filed Jun. 28, 2016, Marco Leo et al.

(Continued)

*Primary Examiner* — Pierre-Michel Bataille
(74) *Attorney, Agent, or Firm* — Seed IP Law Group LLP

(57) ABSTRACT

A plurality of sensors provide respective output data rates, with a first sensor that has a highest output data rate, while one or more other sensors have output data rates that are submultiples of the aforesaid highest output data rate. The data signals coming from the sensors are stored in a memory, e.g., a FIFO memory, by storing the data signals of the first sensor at the aforesaid highest output data rate, accompanying storage of the data signals coming from said first sensor with storage of the data signals coming from the sensors as supplied by said other sensors at the aforesaid submultiple output data rates, so that the data signals are stored in the memory according to a repeated pattern that is common to the various sensors.

20 Claims, 9 Drawing Sheets

(56) References Cited

U.S. PATENT DOCUMENTS

| | | | |
|---|---|---|---|
| 2013/0268736 A1 | 10/2013 | Okamoto et al. | |
| 2014/0365434 A1 | 12/2014 | Chen | |
| 2016/0062768 A1* | 3/2016 | Jagannathan | G06F 9/30047 |
| | | | 711/137 |

OTHER PUBLICATIONS

Borcea et al., "Avatar: Mobile Distributed Computing in the Cloud," *3rd IEEE International Conference on Mobile Computing, Services, and Engineering*: 151-156, 2015.

Data Duplication, retrieved from http://en.wikipedia.org/w/index.php?title=Data_deduplication&oldid-673141320, retrieved on Jul. 26, 2015, 7 pages.

Douglis et al., "Application-specific Delta-encoding via Resemblance Detection," *Usenix Annual Technical Conference*: 1-14, 2003.

Filipe et al., "End-to-end data deduplication for the mobile web," *IEEE International Symposium on Network Computing and Applications*: 334-337, 2011.

Hajduczenia et al., "Deduplication of Tracked Objects Position Data at Single Observation Point of a Vessel Monitoring Systems," *Scientific Journal of PNA* 2(201): 23-32, 2015.

Italian Search Report, dated Feb. 18, 2015, for Italian Application No. IT TO20140545, 2 pages.

Italian Search Report, dated May 10, 2016, for Italian Application No. IT UB20153254, 3 pages.

Sanadhaya et al., "Asymmetric Caching: Improved Network Deduplication for Mobile Devices," *MobiCom'12*: 161-172, 2012.

Shekhar et al., "Vector Map Compression: A Clustering Approach," *GIS'02*: 74-80, Nov. 8-9, 2002.

* cited by examiner

FIG. 8

| Gx | Gy | Gz | XLx | XLy | XLz | Mx | My |
|----|----|----|-----|-----|-----|----|----|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

Read_pointer=0, Fifo_pattern=0

| SENS | GY xyz | XL xyz | MAG xyz | GY xyz | GY xyz | XL xyz | GY xyz |
|------|--------|--------|---------|--------|--------|--------|--------|
| FIFO_PATTERN | 0 1 2 | 3 4 5 | 6 7 8 | 12 13 14 | 15 16 17 | 18 19 20 | 21 22 23 |

FIG. 9

| Gx | Gy | Gz | XLx | XLy | XLz | Mx | My |
|----|----|----|-----|-----|-----|----|----|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

Read_pointer=1, Fifo_pattern=1

| SENS | GY xyz | XL xyz | MAG xyz | GY xyz | GY xyz | XL xyz | GY xyz |
|------|--------|--------|---------|--------|--------|--------|--------|
| FIFO_PATTERN | 0 1 2 | 3 4 5 | 6 7 8 | 12 13 14 | 15 16 17 | 18 19 20 | 21 22 23 |

FIG. 10

| Gx | Gy | Gz | XLx | XLy | XLz | Mx | My |
|----|----|----|-----|-----|-----|-----|-----|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

Read_pointer=2, Fifo_pattern=2

| SENS | GY x y z | XL x y z | MAG x y z | GY x y z | GY x y z | XL x y z | GY x y z |
|------|---|---|---|---|---|---|---|
| FIFO_PATTERN | 0 1 2 | 3 4 5 | 6 7 8 | 12 13 14 | 15 16 17 | 18 19 20 | 21 22 23 |

FIG. 11

| Gx | Gy | Gz | XLx | XLy | XLz | Mx | My |
|----|----|----|-----|-----|-----|-----|-----|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

Read_pointer=23, Fifo_pattern=23

| SENS | GY x y z | XL x y z | MAG x y z | GY x y z | GY x y z | XL x y z | GY x y z |
|------|---|---|---|---|---|---|---|
| FIFO_PATTERN | 0 1 2 | 3 4 5 | 6 7 8 | 12 13 14 | 15 16 17 | 18 19 20 | 21 22 23 |

FIG. 12

| Gx | Gy | Gz | XLx | XLy | XLz | Mx | My |
|---|---|---|---|---|---|---|---|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

Read_pointer=24, Fifo_pattern=0

| SENS | GY x y z | XL x y z | MAG x y z | GY x y z | GY x y z | XL x y z | GY x y z |
|---|---|---|---|---|---|---|---|
| FIFO_PATTERN | 0 1 2 | 3 4 5 | 6 7 8 | 12 13 14 | 15 16 17 | 18 19 20 | 21 22 23 |

FIG. 13

| Gx | Gy | Gz | XLx | XLy | XLz | Mx | My |
|---|---|---|---|---|---|---|---|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | | | | | | |

FIG. 14

| Mx | My | Mz | XLx | XLy | XLz | Mx | My |
|---|---|---|---|---|---|---|---|
| Mz | Gx | Gy | Gz | Gx | Gy | Gz | XLx |
| XLy | XLz | Gx | Gy | Gz | Gx | Gy | Gz |
| XLx | XLy | XLz | Mx | My | Mz | Gx | Gy |
| Gz | Gx | Gy | Gz | XLx | XLy | XLz | Gx |
| Gy | Gz | Gx | Gy | Gz | XLx | XLy | XLZ |

Read_pointer=3, Fifo_pattern=3

| SENS | GY x y z | XL x y z | MAG x y z | GY x y z | GY x y z | XL x y z | GY x y z |
|---|---|---|---|---|---|---|---|
| FIFO_PATTERN | 0 1 2 | 3 4 5 | 6 7 8 | 12 13 14 | 15 16 17 | 18 19 20 | 21 22 23 |

METHOD AND DEVICE FOR STORING DATA IN A MEMORY, CORRESPONDING APPARATUS AND COMPUTER PROGRAM PRODUCT

BACKGROUND

Technical Field

The present disclosure relates to techniques for storing data in a memory.

One or more embodiments may find application in buffer memories (or buffers), for example, of a circular type, which can be used for gathering data coming from different sensors.

Description of the Related Art

A marked trend in the sector of sensors envisages mutual integration of a number of sensors within modules in which there can be integrated also a data-collecting device or data collector capable of reading external sensors, such as, for example, motion sensors. As examples of most commonly used motion sensors there may be cited gyroscopic sensors, accelerometers, and magnetometric sensors.

For instance, within one and the same package it is possible to provide motion sensors in the form of inertial modules with six axes that comprise an accelerometer and a gyroscope by using just two layers (one for the sensors and one for an ASIC). Optionally, it is possible to add a magnetometer to the same package with an inertial module.

Sensors such as gyroscopes, accelerometers, and magnetometric sensors can supply their output data for example as digital data on two bytes for each of the three axes, so that each sensor issues the output data on 6 bytes: 2 bytes for the x axis, 2 bytes for the y axis, and 2 bytes for the z axis.

The data coming from the various sensors may be issued with rates or frequencies (Output Data Rate or ODR) that differ from sensor to sensor. It would be beneficial to store the data coming from the various sensors, with different ODRs, preventing the need to repeat the data unnecessarily and affording the possibility of reconstructing in a simple way the data of the various sensors as read from one and the same memory, such as for example, a buffer memory operating according to a FIFO (First-In/First-Out) scheme.

BRIEF SUMMARY

The object of one or more embodiments is to provide a solution for storing the data coming from different sensors with different ODRs in an efficient way, also as regards the possibility of reconstructing the history of the data as a function of the criteria adopted for their storage.

According to one or more embodiments, the above object is achieved thanks to a method that includes storing in a memory data signals provided by a plurality of sensors at respective output data rates, wherein a first sensor in said plurality has a highest output data rate while one or more other sensors in that plurality have output data rates that are sub-multiples of said highest output data rate. The storing includes storing in said memory the data signals from said first sensor at said highest data rate by accompanying storing of the data signals from said first sensor with storing the data signals from said one or more other sensors as provided by said one or more other sensors at said sub-multiple output data rates, whereby said data signals are stored in said memory in a repeated pattern common to said plurality of sensors.

One or more embodiments may also regard a corresponding system (for example, an inertial-sensor module), an apparatus (such as, for example, a mobile communication terminal like a mobile phone, a tablet, or the like) equipped with such a sensor module, as well as a corresponding computer program product, which can be loaded into the memory of at least one computer and comprises portions of software code that are able to execute the steps of the method when the product is run on at least one computer. As used herein, such a computer program product is understood as being equivalent to a computer-readable means containing instructions for control of the processing system so as to co-ordinate execution of the method according to embodiments.

The claims form an integral part of the technical disclosure provided herein in relation to the embodiments.

One or more embodiments may present one or more of the following advantages:

it is possible to reduce the space occupied at a memory level, for example, in a FIFO memory;

the data of each sensor can be stored with a different ODR;

is possible to generate information of memory pattern (Fifo_pattern), which specifies which axis and which sensor is read at a certain moment;

also in the presence of over-run events, it is possible to understand which sensor will be read first;

the action of extraction (or pulling) of the data is simplified.

BRIEF DESCRIPTION OF THE SEVERAL VIEWS OF THE DRAWINGS

One or more embodiments will now be described, purely by way of non-limiting example, with reference to the annexed figures, wherein:

FIGS. 8 to 14 exemplify, in the form of functional diagrams, possible situations of use of one or more embodiments.

DETAILED DESCRIPTION

In the ensuing description, numerous specific details may be provided to enable an in-depth understanding of examples of embodiments. The embodiments may be implemented without one or more of the specific details, or with other methods, components, materials, etc. In other cases, well known structures, materials, or operations may not be represented or described in detail so that aspects of the embodiments will not be obscured. Any reference in the ensuing description to "an embodiment" or "one embodiment" means that a particular distinctive element, structure, or characteristic described with reference to the embodiment may be included in at least one embodiment. Hence, recurrence of the phrase "in an embodiment" or "in one embodiment" appearing in various points of the present description may not necessarily refer to one and the same embodiment. Furthermore, the particular distinctive elements, structures, or characteristics may be combined in any adequate way in one or more embodiments.

The headings and references used herein are merely provided for convenience and do not interpret the scope or the meaning of the embodiments.

One or more embodiments as exemplified herein may be applied, for example, to sensors of a MEMS (Micro Electro-Mechanical System) type, possibly in NEMS version, with associated memories for gathering the data, for example, at the level of FIFO memories of an embedded type.

Figures 1, 2:
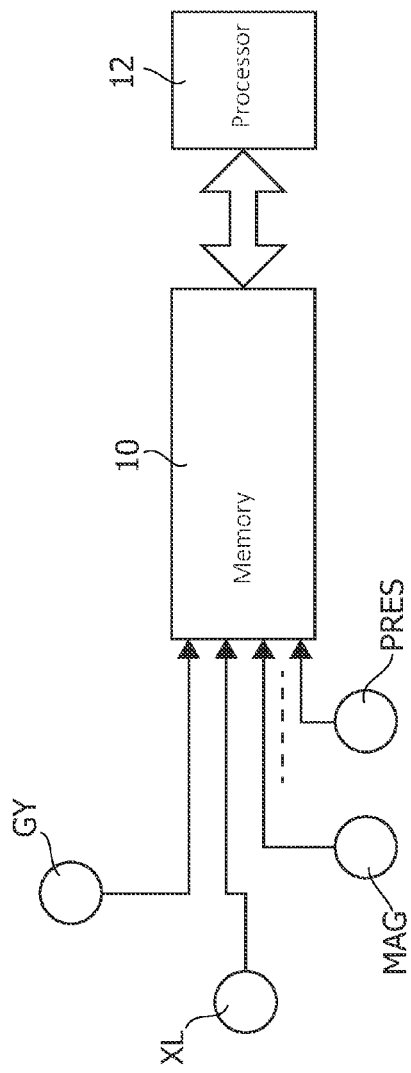
FIG. 1 is a general block diagram of a system that is able to incorporate one or more embodiments, which represents an implementation of a method for storing data in a memory.
FIG. 2 exemplifies an implementation of storage in a memory.

In the block diagram of FIG. 1, the reference 10 designates such a memory in which the data coming from one or more sensors are stored.

One or more of the examples indicated in what follows may refer to the possible presence of one or more of the following sensors:
 a gyroscopic sensor GY;
 an accelerometric sensor XL;
 a magnetometric sensor MAG; and
 a pressure sensor PRES.

This list has is provided purely by way of example, both as regards the number and as regards the nature of the sensors.

By way of reference (and also here without any intent to limit the embodiments) it may be assumed that the data at output from the various sensors are organized, for example, as data on 6 bytes comprising three pairs of bytes, with each pair of bytes representing the information regarding one of the axes of an xyz system (i.e., 2 bytes for the x axis, 2 bytes for the y axis, and 2 bytes for the z axis).

Once again by way of non-limiting example it may be assumed that the sensors in question operate at different output data rates (ODRs) that are submultiples of a highest or maximum ODR (for example, 50 Hz, 100 Hz, 200 Hz, 800 Hz). It may likewise be assumed that when two or more sensors issue simultaneously their signals, output of the data, albeit occurring at different ODRs, is obtained synchronously. It will be appreciated that these hypotheses are here made primarily to facilitate illustration and understanding of the embodiments.

Without excluding the possibility of resorting to one or more of the embodiments as exemplified herein, the number (and type) of the sensors, as well as the format of the data supplied by them (for example, the number of bytes on which the aforesaid data are organized) may be modified. It will be likewise assumed that operation of the memory 10 occurs, for example, according to a general FIFO scheme under the control of an associated processor (AP) 12 according to the criteria illustrated more fully in what follows.

FIG. 2 is a schematic illustration of an implementation in which the signals coming from two sensors (the gyroscopic sensor GY and the accelerometric sensor XL) are stored in the memory 10 at a rate corresponding to the highest ODR.

For example, assuming that the gyroscopic sensor GY issues its data (for example, 6 bytes, corresponding to the three axes x, y, and z) 1 at an ODR of 200 Hz and likewise assuming that the accelerometric sensor XL issues its homologous data at an ODR of 100 Hz, the scheme of FIG. 2 exemplifies a situation where storage at the frequency of 200 Hz involves an unnecessary duplication of the data of the accelerometric sensor XL.

For instance, observing the three columns further to the left in the table of FIG. 2 it may be seen that each "triplet" of data $Gx_1, Gy_1, Gz_1; Gx_2, Gy_2, Gz_2; Gx_3, Gy_3, Gz_3; \ldots$ issued by the gyroscopic sensor is stored just once at the ODR of the gyroscopic sensor GY. Looking now at the columns further to the right it may be seen, instead, that each of the corresponding triplets of the accelerometric sensor XL, i.e., $XLx_1, XLy_1, XLz_1; XLx_2, XLy_2, XLz_2; XLx_3,$ $XLy_3, XLz_3; \ldots$ issued by the sensor XL at an ODR of 100 Hz is stored twice, giving rise to a redundancy and to a corresponding waste of memory space.

Furthermore, assuming that each cell in the table of FIG. 2 is such as to contain 2 bytes (i.e., 16 bits), it may be noted that the column of the RAM may not be a multiple of 6 bytes.

A possibility for overcoming the above situation could be that of saving a label or tag indicating which sensor is written in the memory 10, which would enable storage of the data at different ODRs with a corresponding solution for reconstructing the data correctly.

Such a solution, however, comes up against the difficulty represented by the fact that storage of the information regarding the tags in turn absorbs memory space. For instance, it may be estimated that storage of information regarding the tags and the corresponding timestamps could absorb approximately 10% of the space available in the memory 10.

There is thus felt the need to enable storage of data in the conditions outlined above, it being possible on the other hand to reconstruct the integrity of the data without any need to store tags of sensors also in the presence of potential operations of overwriting in the memory 10 (with synchronous/asynchronous readings).

For instance, it is possible to hypothesise using a register such as to indicate how many valid data bytes are contained in the memory 10 (for example, up to 512 data bytes). If the memory is completely filled there is the risk of continuing to enter new sensor data into the memory 10, overwriting the data previously stored. In addition to this, there is the further risk of the alignment of the data of the sensors possibly modifying the overflow condition, with consequent need to reset the memory in the case where an overflow condition arises.

Figure 3:
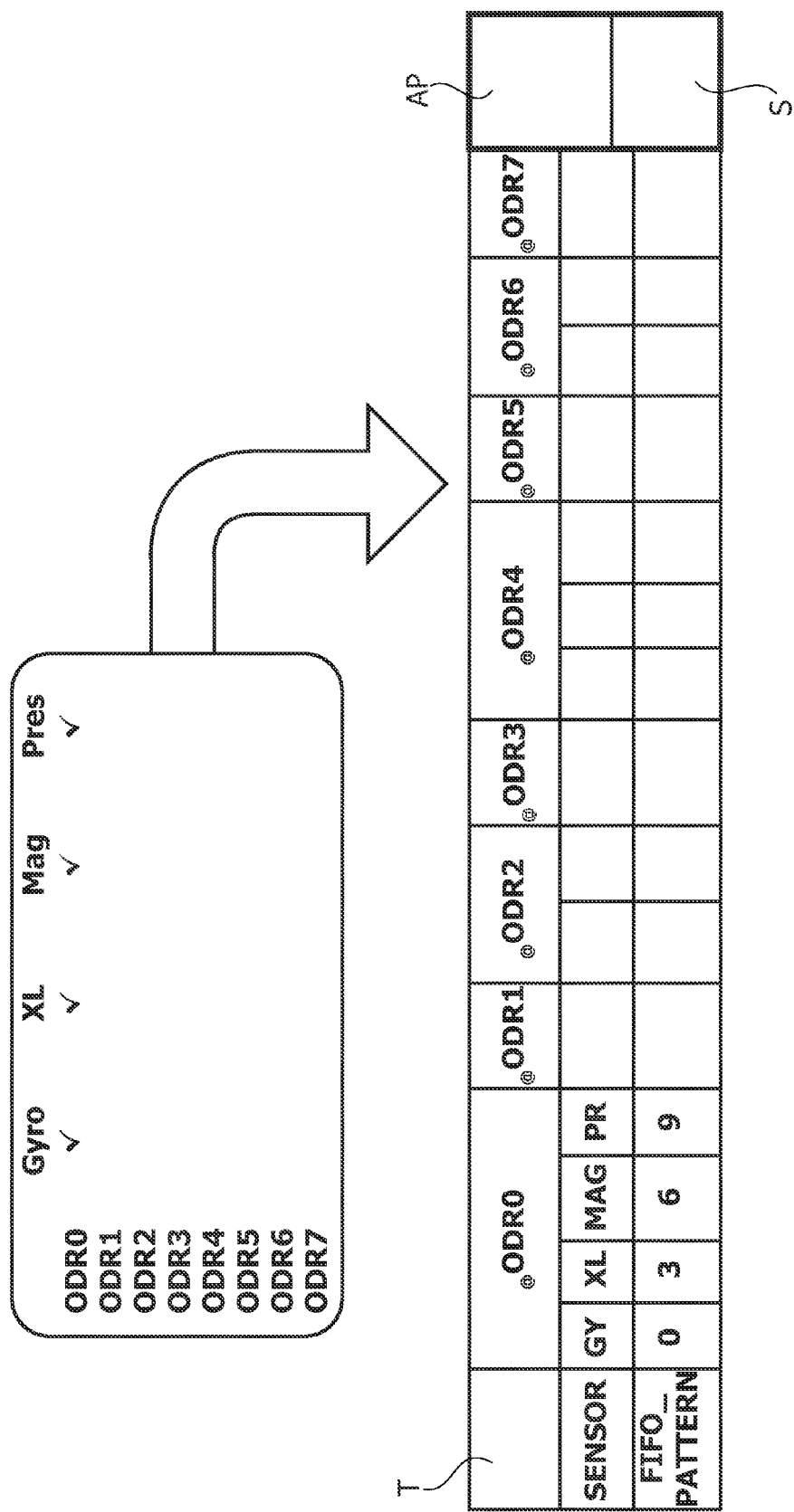
FIGS. 3 to 7 are provided by way of example of one or more embodiments.

One or more embodiments as exemplified in FIG. 3 and the subsequent figures envisage construction of a pattern of the type of data starting, for example, from a user pattern. Moreover provided is a pointer such as to enable the user to identify which data are read at any moment.

One or more embodiments enable storage in the memory 10 of the data of the various sensors GY, XL, . . . without giving rise to redundancies (repetitions), maintaining the possibility of writing the corresponding data according to the various ODRs of the various sensors.

In one or more embodiments, starting from the configurations of the device (i.e., which sensors are active, the corresponding ODRs, etc.) it is possible to identify a common minimal pattern that may be written in a repetitive way in the memory 10 offering to the user the information regarding which sensor can be read from the memory 10, for example, in the form of an index corresponding to a vector/matrix of the common minimal pattern.

It is moreover envisaged, in one or more embodiments, to store the data coming from a first sensor, chosen as the one with the highest output data rate (ODR), accompanying storage of the data coming from the aforesaid first sensor with storage of the data coming from the other sensors (issued by the other sensors with output data rates that are submultiples of the aforesaid highest output data rate) so that the data of the various sensors are stored in the memory according to a common pattern that is repeated.

For instance, it may be assumed (once again by way of example that in no way limits the scope of the embodiments) that the various sensors illustrated in FIG. 10 operate with the following ODRs:

gyroscopic sensor GY: 200 Hz,
accelerometric sensor XL: 200/2 Hz=100 Hz,
magnetometric sensor MAG: 200/4 Hz=50 Hz,
pressure sensor PRES: 200/8 Hz=25 Hz.

In these conditions (which, it is emphasized, are provided purely by way of example), it is possible to think of operating the memory 10 with a timebase corresponding to the highest ODR (that of the gyroscopic sensor GY), namely with a timebase of 1/(200 Hz)=5 ms.

It is likewise envisaged that, for example every 5 ms (i.e., at the rate of operation of the memory 10), the "new" data generated by each individual sensor are written in the memory 10.

In this way, once again reasoning by way of example, every 5 ms there will be writing of data of the gyroscopic sensor GY, whereas the data of the accelerometric sensor XL will be written just once every 10 ms, those of the magnetometric sensor once every 20 ms, and those of the pressure sensor once every 40 ms.

Such a pattern, which can be repeated indefinitely, is suited to being represented as an indexed pattern comprising first indexed entries for storage events that take place at the aforesaid highest data rate and second indexed entries indicating i) which data are stored in the memory at each storage event and ii) for which sensors the data are stored.

For instance, the aforesaid pattern is suited to being represented in the form of a matrix (see, for example, the top part of FIGS. 3 to 7), with:
  each of the rows (first indexed entries) of the matrix that identify a certain writing instant (ODR 0, ODR 1, ODR 2, ODR 3, . . . ), which follow one another at the rate identified by the highest ODR (in the present case the 200 Hz of the gyroscopic sensor GY); and
  each of the columns, i.e., of the row locations (second indexed entries), with a symbol, for example, a "1" or a tick symbol, that identifies the fact that at a given instant the datum of a given sensor is written in the memory 10.

In one or more embodiments such a common-pattern matrix can be computed, for example, by the processor 12 with the possibility of identifying the location of the matrix whenever the processor itself pulls data from the memory 10, with the possibility of ensuring integrity of the data.

In one or more embodiments the aforesaid common minimal pattern can be calculated using the criteria described below.

The "fastest" sensor (in the example considered here the gyroscopic sensor GY) is located in the column 1 of the matrix (in so far as this sensor supplies a data for each ODR), with the possibility of constructing the matrix proceeding in time until the first row is filled in (i.e., forming the first row where all the sensors supply a datum).

If D_4, D_2, and D_3 denote the ratio between the operating frequency of the fastest sensor (in the present case, the gyroscopic sensor GY) and, in order, the various other sensors that are progressively "slower" (in the example considered here, the accelerometric sensor, the magnetometric sensor, and the pressure sensor), an algorithm of construction of the matrix in question may be the one corresponding to the pseudo-code reproduced hereinafter.

```
i = 1;
flag = 0;
while not(flag == 2)
    matrix(i,1) = 1;
    if rem(i,D_2) == 1
        matrix(i,2) = 1;
    end
    if rem(i,D_3) == 1
        matrix(i,3) = 1;
    end
    if rem(i,D_4) == 1
        matrix(i,4) = 1;
    end
    if all(matrix(i,:) == [1,1,1,1])
        if flag == 1
            fragm_fifo = matrix(1:end-1,:);
        end
        flag = flag+1;
    end
    i = i+1;
end
```

The sequence of FIGS. 3 to 7 exemplifies how, by following the above matrix (represented in the top part of the figures in question), it is possible to proceed to filling the memory 10 at the instants indicated progressively by @ODR0, @ODR1, @ODR 2, . . . , @ODR 7 (separated by an interval corresponding to the working frequency of the memory 10 chosen—as has already been said previously—so as to correspond to the ODR of the fastest sensor) by loading into the memory the signals of the various sensors (designated by the references GY, XL, MAG, PRES), with a signal Fifo_pattern representing the organization of the data in the memory.

For instance, in FIG. 3, it may be seen how at the instant @ODR0 (in which the matrix represented in the top part indicates that signals have been received by all four sensors GY, XL, MAG and PRES), the corresponding memory locations are loaded with the values 0, 3, 6 and 9 of the signal Fifo_pattern. It is to be recalled that the example presented herein presupposes, without this implying any limitation, that each of the sensors in question issues signals on 6 bytes organized in three pairs of bytes, each corresponding to one of the three axes x, y, z.

Figure 4:
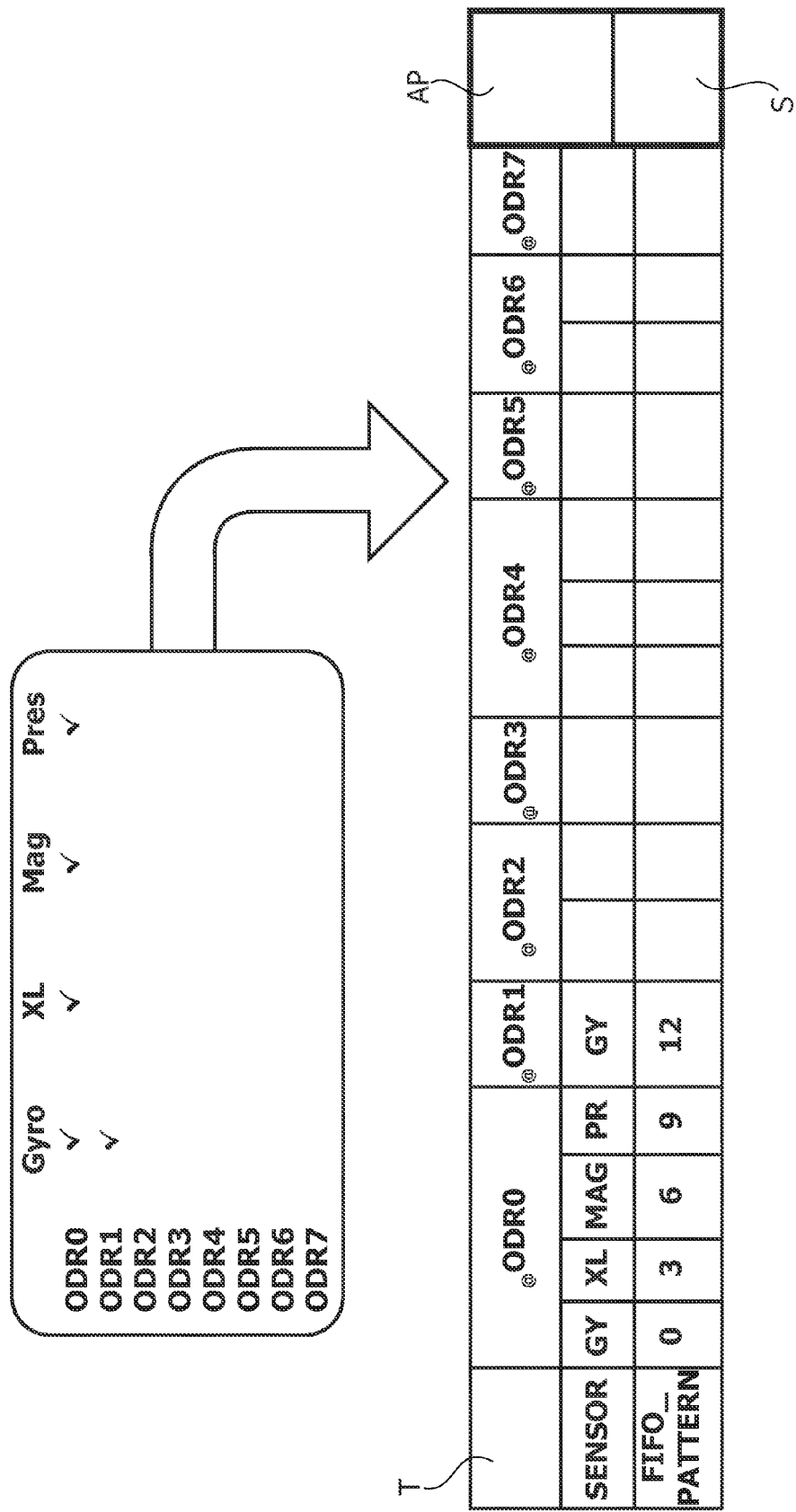

FIG. 4 illustrates a situation that may arise at the instant @ODR1 (separated from the instant @ODR0 by an interval equal to 1/(200 Hz)=5 ms corresponding to the ODR of the fastest sensor, i.e., the gyroscopic sensor GY), where in the memory 10 only the signal of the above sensor GY is stored. As indicated by the matrix in the top part of FIG. 4 at the instant @ODR1 the only "new" signal is precisely that of the gyroscopic sensor GY.

Figure 5:
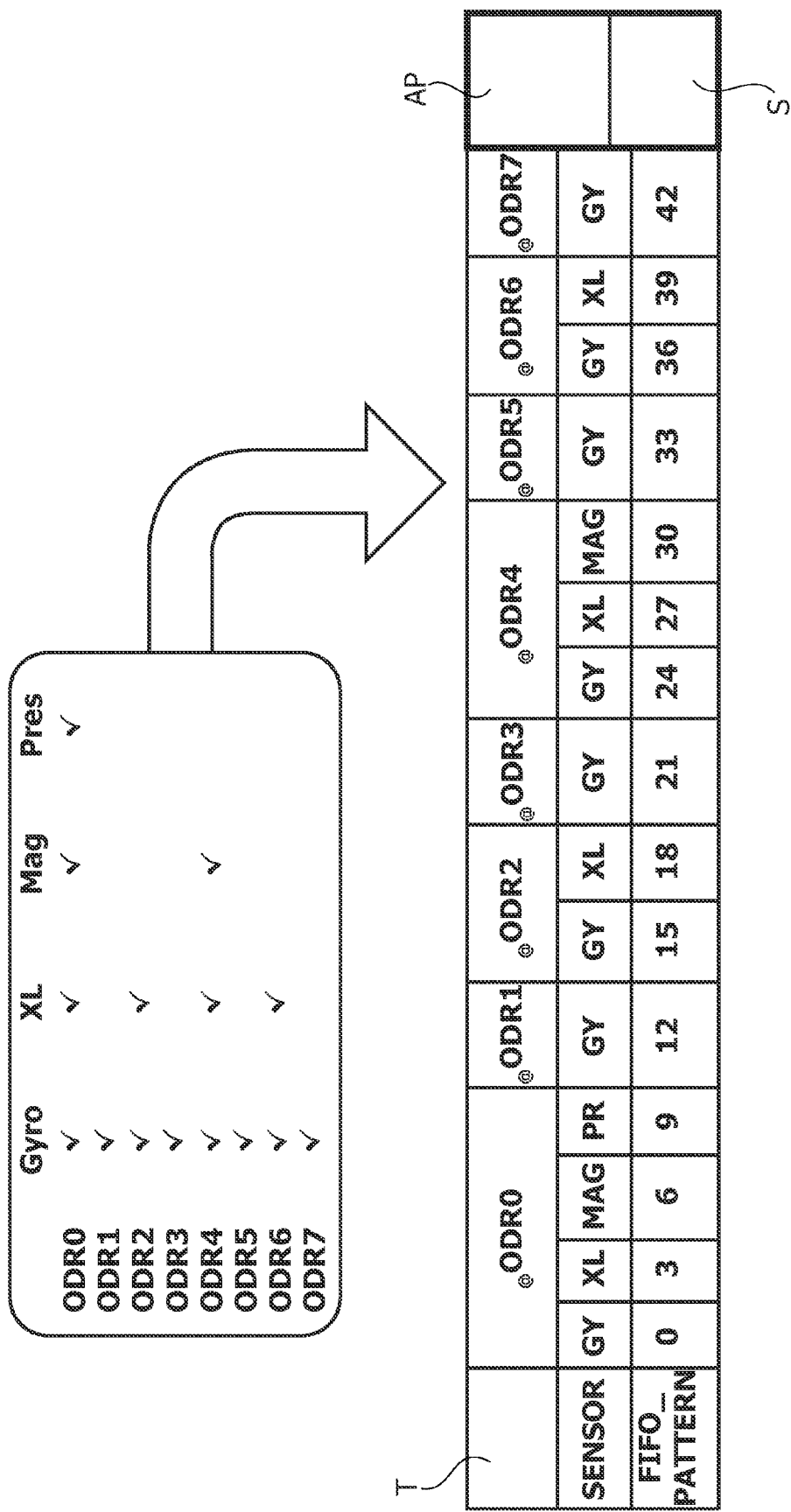

FIG. 5 adds to the previous representation the result of the loading operations performed:
  at the instant @ODR2 (signals supplied by the gyroscopic sensor GY and by the accelerometric sensor XL);
  at the instant @ODR3 (signal supplied only by the gyroscopic sensor GY);
  at the instant @ODR4 (signals supplied by the gyroscopic sensor GY, by the accelerometric sensor XL, and by the magnetometric sensor MAG);
  at the instant @ODR5 (signal supplied only by the gyroscopic sensor GY);
  at the instant @ODR6 (signals supplied by the gyroscopic sensor GY and by the accelerometric sensor XL);
  at the instant @ODR7 (signal supplied once again only by the gyroscopic sensor GY).

The above is as represented with the matrix appearing in the top part of FIG. 5, i.e., with the data signals of the various sensors GY, XL, MAG, PRES stored in the memory 10 according to a pattern that is repeated and is common to all the sensors GY, XL, MAG, PRES.

Figure 6:
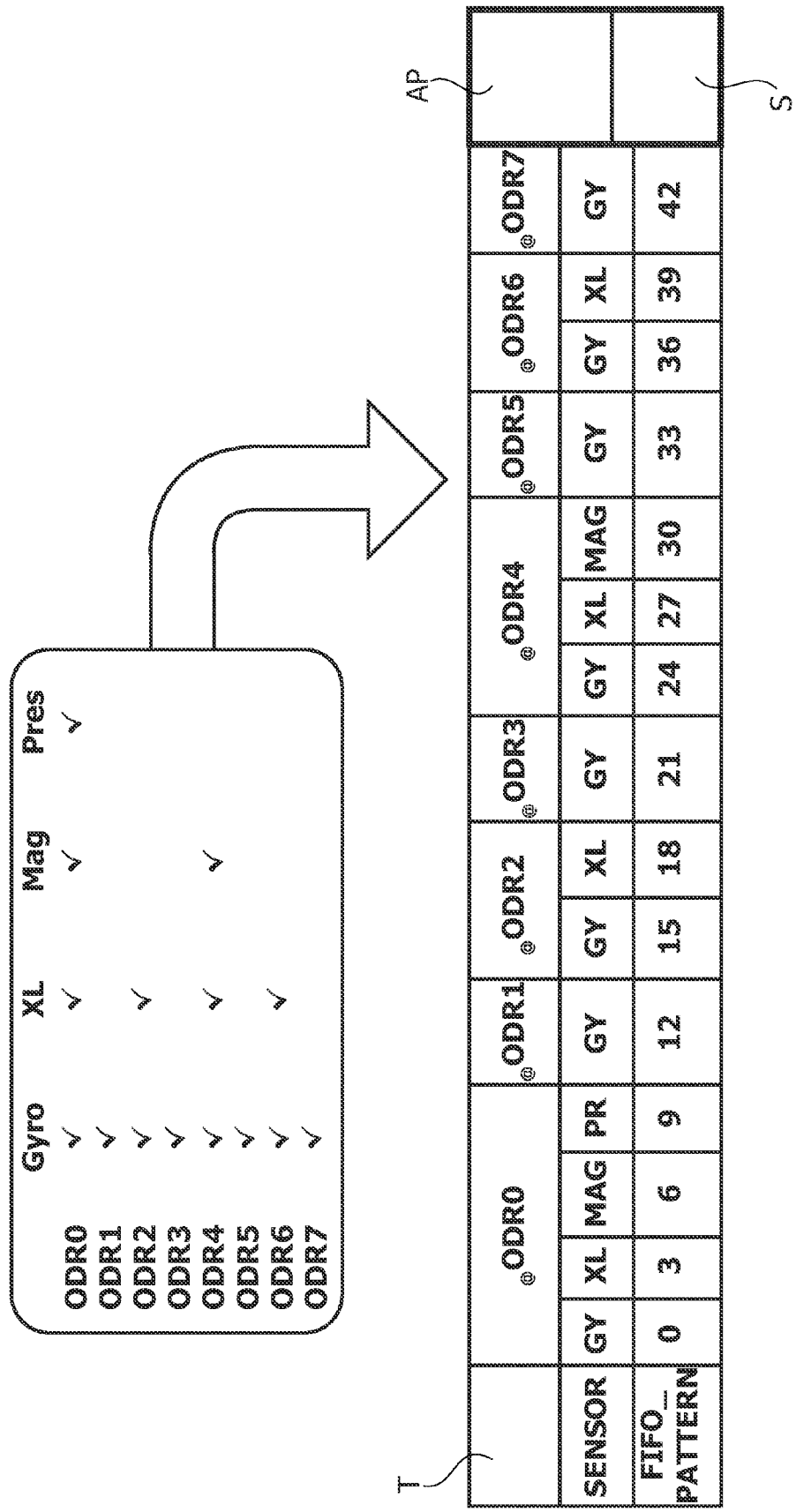

The scheme of FIG. 6 (in itself practically identical to the scheme of FIG. 5) highlights the fact that, in one or more embodiments, the memory 10 may be organized according to a circular scheme so that the sequence exemplified in FIGS. 3, 4, and 5 can be performed in a cyclic way starting again from the situation exemplified with reference to the instant @ODR0 (return to the first row of the matrix).

From an observation of FIGS. 3 to 6, it emerges that, if at the level of processor 12 the logic of construction of the matrix represented in the top part of the figures is known, the processor 12 has available (for example, in the form of a decoding or reading vector AP) information identifying the pattern of loading of the signals of the sensors, with the signal Fifo_pattern representing the state of the various registers.

Figure 7:
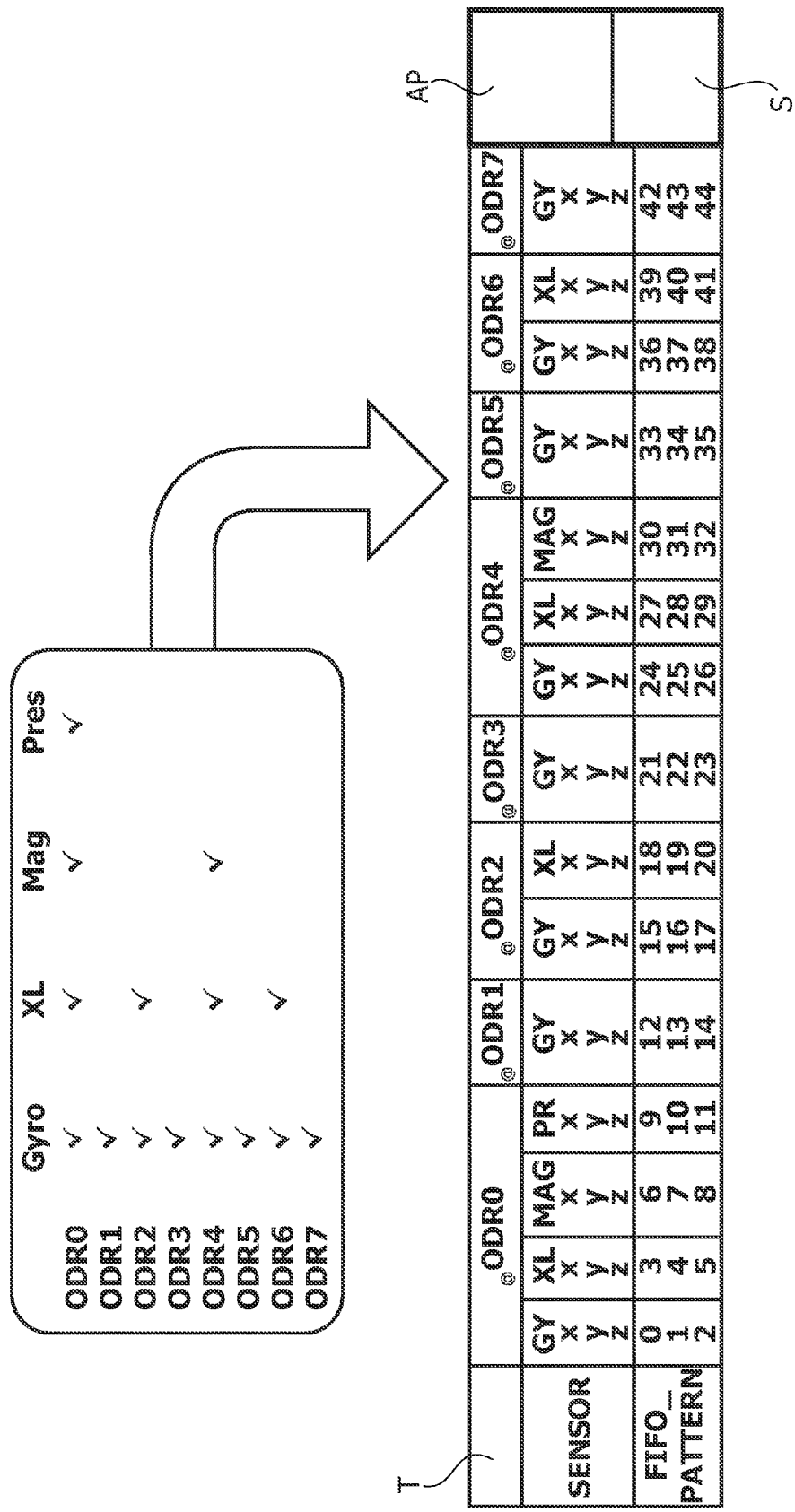

The representation of FIG. 7 highlights in this regard the fact that the latter information may be discretized at the level of individual signal, with the consequent possibility of identifying the memory locations in which the individual signals that form each "triplet" have been loaded, which makes it possible to distinguish, for example, where there are the signals regarding the x axis, the signals regarding the y axis, and the signals regarding the z axis. This applies also in the case where these signal components (which here are assumed for simplicity as being all organized on 2 bytes) are organized on different lengths.

In one or more embodiments, the signal Fifo_pattern can consequently enable identification of which axis and which sensor is read at a given instant, also with the possibility, in the case of over-run phenomena, of understanding which is the first sensor being read.

In one or more embodiments, the processor 12 is able to compute a vector that enables decoding of the information read starting from the status information (represented precisely by the signal Fifo_pattern), on the basis of the "decimation" pattern, i.e., as a function of the parameters $D\_4, D\_2, D\_3$, etc. that identify, for the sensors XL, MAG, PRES other than the fastest sensor, by how much each individual sensor is slower than the aforesaid fastest sensor (the gyroscopic sensor GY in the present case).

In one or more embodiments, on the basis of the pattern, the number of data that can be written may be variable at each instant @ODRn (with n=0, . . . , 7) so that the flag indicating the fact that the memory 10 is full (FIFO full flag) can be modified so as to prevent the over-run effect.

Occurrence of this event would in fact lead to overwriting and consequent loss of the oldest data. In one or more embodiments of a storage device, it may in fact be important to prevent this from happening. For this reason, the full flag, when active, can indicate that upon subsequent writing the data will be overwritten.

These operating modes are exemplified in FIG. 8 onwards, where, in order to be able to apprehend some peculiarities of one or more embodiments without giving rise to an excessively complex representation, it is assumed that we are in the presence of a situation of use where in the memory 10 the signals of just three sensors are stored, namely the signals Gx, Gy, Gz of the gyroscopic sensor GY, the signals XLx, XLy, XLz of the accelerometric sensor XL and the signals Mx, My, Mz of the magnetometric sensor MAG. It is recalled that the suffixes x, y, and z identify the axis of detection to which the individual signal component refers.

FIG. 8 exemplifies a first reading operation corresponding to the x component of the signal of the gyroscopic sensor GY read in the location identified by the value 0 of the signal Fifo_pattern.

This condition may be viewed as corresponding to a reading operation performed with a reading pointer Read_pointer=0 and a value of Fifo_pattern=0.

FIG. 9 exemplifies, instead, reading of the second component of the same signal, performed with values of Read_pointer=1, Fifo_pattern=1.

FIG. 10 exemplifies the operation of reading of the third component Gz with Read_pointer=2 and Fifo_pattern=2.

The above operating procedure can proceed up to the condition represented in FIG. 11 corresponding to values Read_pointer=23, Fifo_pattern=23, i.e., to the condition corresponding to reading of the end of the pattern.

FIG. 12 illustrates, instead, a new reading operation performed with a value of Read_pointer=24 and of Fifo_pattern=0.

FIG. 13 exemplifies the possible occurrence of an event of total filling of the memory 10 (FIFO-full event) so that, as indicated by the arrow in FIG. 13, at the subsequent ODR instant, for the particular pattern given in the example, there could occur a writing of data corresponding to nine axes.

In these conditions, it is possible to raise, for example to a "high" value, a flag FIFO_FULL that may correspond to a sort of prediction of an event of complete filling of the memory so as to prevent overwriting of data.

Prior to the over-run condition, the situation that may arise in effect corresponds to the one exemplified in FIG. 8 (i.e., with Read_pointer=0 and Fifo_pattern=0).

In these conditions, in one or more embodiments, it is possible to operate as exemplified in FIG. 14, i.e., envisaging a condition identified by Read_pointer=3, Fifo_pattern=3 and hence envisage that a possible overwriting may take place axis by axis. In one or more embodiments, the signal Fifo_pattern makes it in fact possible to understand which type of data will be read at the next reading.

Of course, without prejudice to the principle of underlying, the details of construction and the embodiments may vary, even significantly, with respect to what is illustrated herein purely by way of non-limiting example, without thereby departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system including:
a memory configured to store data signals provided by a plurality of sensors at respective output data rates, wherein a first sensor in said plurality has a highest output data rate and one or more other sensors in said plurality have output data rates that are sub-multiple of said highest output data rate, and
a processor coupled to said memory and configured to store in the memory data signals provided by a plurality of sensors at respective output data rates, wherein a first sensor in said plurality has a highest output data rate while one or more other sensors in that plurality have output data rates that are sub-multiples of said highest output data rate, including storing in said memory the data signals from said first sensor at said highest data rate by accompanying storing of the data signals from said first sensor with storing the data signals from said one or more other sensors as provided by said one or more other sensors at said sub-multiple output data rates, whereby said data signals are stored in said memory in a repeated pattern common to said plurality of sensors.

2. The system of claim 1, wherein said repeated common pattern is an indexed pattern including first indexed entries for storing events taking place at said highest data rate and second indexed entries indicative of which data signals from which sensors of said plurality are stored in the memory at each of a plurality of storing events.

3. The system of claim 2, wherein said indexed pattern is a matrix pattern that includes rows indicative of storing events taking place at said highest data rate and locations in said rows are indicative of which data signals from which sensors of said plurality are stored in the memory at each of said plurality of storing events.

4. The system of claim 2, wherein the processor is configured to retrieve data signals from said memory using a pointer pointing to said first and second indexed entries.

5. The system of claim 1, wherein the processor is configured to:
detect a full condition of said memory, and at least one of:
raise a flag to prevent overwriting of data signals in the memory in response to detecting said full condition of said memory, and
permit overwriting of data in said memory on an axis-by-axis basis, wherein said data signals from said sensors include data signal components related to plural detection axes.

6. An apparatus comprising:
a plurality of sensors configured to provide data signals at respective output data rates, wherein a first sensor in said plurality has a highest output data rate while one or more other sensors in said plurality have output data rates that are sub-multiples of said highest output data rate,
a memory configured to store data signals provided by a plurality of sensors at respective output data rates, wherein a first sensor in said plurality has a highest output data rate and one or more other sensors in said plurality have output data rates that are sub-multiple of said highest output data rate, and
a processor coupled to said memory and configured to store in the memory data signals provided by a plurality of sensors at respective output data rates, wherein a first sensor in said plurality has a highest output data rate while one or more other sensors in that plurality have output data rates that are sub-multiples of said highest output data rate, including storing in said memory the data signals from said first sensor at said highest data rate by accompanying storing of the data signals from said first sensor with storing the data signals from said one or more other sensors as provided by said one or more other sensors at said sub-multiple output data rates, whereby said data signals are stored in said memory in a repeated pattern common to said plurality of sensors.

7. The apparatus of claim 6, wherein said repeated common pattern is an indexed pattern including first indexed entries for storing events taking place at said highest data rate and second indexed entries indicative of which data signals from which sensors of said plurality are stored in the memory at each of a plurality of storing events.

8. The apparatus of claim 7, wherein said indexed pattern is a matrix pattern that includes rows indicative of storing events taking place at said highest data rate and locations in said rows are indicative of which data signals from which sensors of said plurality are stored in the memory at each of said plurality of storing events.

9. The apparatus of claim 7, wherein the processor is configured to retrieve data signals from said memory using a pointer pointing to said first and second indexed entries.

10. The apparatus of claim 6, wherein the processor is configured to:
detect a full condition of said memory, and at least one of:
raise a flag to prevent overwriting of data signals in the memory in response to detecting said full condition of said memory, and
permit overwriting of data in said memory on an axis-by-axis basis, wherein said data signals from said sensors include data signal components related to plural detection axes.

11. A method, comprising:
providing a processor;
providing a memory;
receiving data signals provided by a plurality of sensors at respective output data rates, wherein a first sensor in said plurality has a highest output data rate while one or more other sensors in that plurality have output data rates that are sub-multiples of said highest output data rate; and
executing instructions with the processor to direct storing the received data signals in the memory, the storing including storing in said memory the data signals from said first sensor at said highest data rate by accompanying storing of the data signals from said first sensor with storing the data signals from said one or more other sensors as provided by said one or more other sensors at said sub-multiple output data rates, whereby said data signals are stored in said memory in a repeated pattern common to said plurality of sensors.

12. The method of claim 11, wherein said repeated common pattern is an indexed pattern including first indexed entries for storing events taking place at said highest data rate and second indexed entries indicative of which data signals from which sensors of said plurality are stored in the memory at each of a plurality of storing events.

13. The method of claim 12, wherein said indexed pattern is a matrix pattern that includes rows indicative of storing events taking place at said highest data rate and locations in said rows are indicative of which data signals from which sensors of said plurality are stored in the memory at each of said plurality of storing events.

14. The method of claim 12, including retrieving data signals from said memory using a pointer pointing to said first and second indexed entries.

15. The method of claim 11, including detecting a full condition of said memory, wherein, upon said full condition of said memory being detected, the method includes at least one of:
raising a flag to prevent overwriting of data signals in the memory, and
wherein said data signals from said sensors include data signal components related to plural detection axes, permitting overwriting of data in said memory on an axis-by-axis basis.

16. The method of claim 11, including operating said memory as a first in-first out memory.

17. The method of claim 11, including operating said memory as a circular memory.

18. A non-transitive computer readable medium configured to cause at least one processor to implement a method comprising:

storing in a memory data signals provided by a plurality of sensors at respective output data rates, wherein a first sensor in said plurality has a highest output data rate while one or more other sensors in that plurality have output data rates that are sub-multiples of said highest output data rate, the storing including storing in said memory the data signals from said first sensor at said highest data rate by accompanying storing of the data signals from said first sensor with storing the data signals from said one or more other sensors as provided by said one or more other sensors at said sub-multiple output data rates, whereby said data signals are stored in said memory in a repeated pattern common to said plurality of sensors.

19. The non-transitive computer readable medium of claim 18, wherein said repeated common pattern is an indexed pattern including first indexed entries for storing events taking place at said highest data rate and second indexed entries indicative of which data signals from which sensors of said plurality are stored in the memory at each of a plurality of storing events.

20. The non-transitive computer readable medium of claim 19, wherein said indexed pattern is a matrix pattern that includes rows indicative of storing events taking place at said highest data rate and locations in said rows are indicative of which data signals from which sensors of said plurality are stored in the memory at each of said plurality of storing events.

* * * * *